United States Patent
Boulanger et al.

(10) Patent No.: US 9,672,292 B2
(45) Date of Patent: Jun. 6, 2017

(54) AFFINITY-BASED PAGE NAVIGATION

(71) Applicant: Microsoft Technology Licensing, LLC, Redmond, WA (US)

(72) Inventors: Catherine N. Boulanger, Redmond, WA (US); John G. A. Weiss, Lake Forest Park, WA (US); Steven Nabil Bathiche, Kirkland, WA (US); Paul Henry Dietz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 539 days.

(21) Appl. No.: 13/683,936

(22) Filed: Nov. 21, 2012

(65) Prior Publication Data

US 2014/0143707 A1     May 22, 2014

(51) Int. Cl.
| G06F 17/30 | (2006.01) |
| G06F 3/0483 | (2013.01) |
| G06F 1/16 | (2006.01) |
| G06F 3/041 | (2006.01) |
| G06F 3/0487 | (2013.01) |

(52) U.S. Cl.
CPC ...... *G06F 17/30884* (2013.01); *G06F 1/1626* (2013.01); *G06F 3/0414* (2013.01); *G06F 3/0483* (2013.01); *G06F 3/0487* (2013.01); *G06F 2203/04102* (2013.01)

(58) Field of Classification Search
CPC .............................................. G06F 17/30884
See application file for complete search history.

(56) References Cited

U.S. PATENT DOCUMENTS

| 5,508,717 A * | 4/1996 | Miller ........................... 715/858 |
| 5,909,207 A | 6/1999 | Ho |
| 6,243,071 B1 | 6/2001 | Shwarts et al. |
| 6,486,895 B1 | 11/2002 | Robertson et al. |
| 6,493,702 B1 | 12/2002 | Adar et al. |

(Continued)

FOREIGN PATENT DOCUMENTS

| CN | 101425089 | 5/2009 |
| CN | 102707873 | 10/2012 |

(Continued)

OTHER PUBLICATIONS

Geyer, et al., "AffinityTable—A Hybrid Surface for Supporting Affinity Diagramming", Retrieved at <<http://hci.uni-konstanz.de/downloads/FG_AffinityTable_Springer.pdf>>, In the proceedings of the 13th IFIP TC 13 international conference on Human-computer interaction, vol. Part III, Sep. 21, 2011, pp. 8.

(Continued)

*Primary Examiner* — William Bashore
*Assistant Examiner* — Nathan Shrewsbury

(57) ABSTRACT

This document describes techniques and apparatuses enabling affinity-based page navigation. These techniques and apparatuses enable page navigation, such as page flipping, page searches, and other navigation based on affinities associated with various pages. These affinities can include a reference to a page, such as a link or quotation in a social networking service, an encyclopedia, a webpage, an article, a newspaper, or a blog. These affinities can also or instead include usage, such as how many users have read, highlighted, dog-eared, or bookmarked a page.

20 Claims, 12 Drawing Sheets

(56) References Cited

U.S. PATENT DOCUMENTS

| | | | |
|---|---|---|---|
| 6,559,873 B1* | 5/2003 | Dawkins et al. | 715/862 |
| 6,769,096 B1* | 7/2004 | Kuppusamy et al. | 715/234 |
| 6,943,773 B2 | 9/2005 | Wong et al. | |
| 6,989,815 B2 | 1/2006 | Liang et al. | |
| 7,283,129 B1 | 10/2007 | Sawada et al. | |
| 7,290,285 B2 | 10/2007 | McCurdy et al. | |
| 7,810,042 B2 | 10/2010 | Keely et al. | |
| 7,836,051 B1 | 11/2010 | Mason | |
| 7,898,541 B2 | 3/2011 | Hong et al. | |
| 8,018,431 B1 | 9/2011 | Zehr et al. | |
| 8,413,904 B1 | 4/2013 | Zehr et al. | |
| 8,766,919 B1 | 7/2014 | Lachwani et al. | |
| 9,495,470 B2 | 11/2016 | Boulanger et al. | |
| 2002/0145631 A1* | 10/2002 | Arbab et al. | 345/786 |
| 2002/0167481 A1 | 11/2002 | Wong et al. | |
| 2003/0112269 A1* | 6/2003 | Lentz et al. | 345/738 |
| 2004/0150657 A1 | 8/2004 | Wittenburg et al. | |
| 2004/0212588 A1 | 10/2004 | Moriyama | |
| 2005/0005246 A1* | 1/2005 | Card | G06F 3/0483 715/776 |
| 2005/0108233 A1* | 5/2005 | Metsatahti et al. | 707/9 |
| 2005/0184956 A1 | 8/2005 | Wong et al. | |
| 2006/0125802 A1 | 6/2006 | Liang et al. | |
| 2006/0150096 A1 | 7/2006 | Thacker et al. | |
| 2006/0194181 A1 | 8/2006 | Rosenberg | |
| 2006/0236262 A1 | 10/2006 | Bathiche et al. | |
| 2007/0048717 A1 | 3/2007 | Hsieh | |
| 2007/0055410 A1 | 3/2007 | Morohoshi | |
| 2007/0085845 A1 | 4/2007 | Kikuchi et al. | |
| 2007/0100996 A1* | 5/2007 | Stebbins | 709/224 |
| 2008/0033969 A1 | 2/2008 | Koo et al. | |
| 2008/0222295 A1* | 9/2008 | Robinson et al. | 709/227 |
| 2008/0256484 A1* | 10/2008 | Kraft et al. | 715/799 |
| 2009/0189749 A1 | 7/2009 | Salada | |
| 2009/0219247 A1 | 9/2009 | Watanabe et al. | |
| 2010/0175018 A1 | 7/2010 | Petschnigg et al. | |
| 2011/0087955 A1 | 4/2011 | Ho et al. | |
| 2011/0181894 A1 | 7/2011 | Martin | |
| 2011/0191692 A1 | 8/2011 | Walsh et al. | |
| 2011/0209057 A1 | 8/2011 | Hinckley | |
| 2011/0221748 A1 | 9/2011 | Hodges et al. | |
| 2011/0227822 A1 | 9/2011 | Shai | |
| 2012/0078612 A1 | 3/2012 | Kandekar et al. | |
| 2012/0124505 A1 | 5/2012 | St. Jacques, Jr. | |
| 2012/0131427 A1 | 5/2012 | Artin | |
| 2012/0154293 A1 | 6/2012 | Hinckley et al. | |
| 2012/0210211 A1* | 8/2012 | Min et al. | 715/255 |
| 2012/0240075 A1* | 9/2012 | Kim et al. | 715/776 |
| 2012/0246593 A1* | 9/2012 | Rauenzahn et al. | 715/784 |
| 2012/0260163 A1* | 10/2012 | Kim et al. | 715/273 |
| 2013/0021281 A1 | 1/2013 | Tse et al. | |
| 2013/0169562 A1* | 7/2013 | Cho et al. | 345/173 |
| 2013/0268851 A1* | 10/2013 | Joo et al. | 715/255 |
| 2013/0332850 A1* | 12/2013 | Bovet et al. | 715/752 |
| 2014/0139421 A1 | 5/2014 | Boulanger | |
| 2014/0143705 A1 | 5/2014 | Boulanger | |
| 2014/0143706 A1 | 5/2014 | Boulanger | |

FOREIGN PATENT DOCUMENTS

| | | |
|---|---|---|
| DE | 10207115 | 9/2003 |
| EP | 1548649 | 6/2005 |
| EP | 2472379 | 7/2012 |
| WO | WO-2004068303 | 8/2004 |

OTHER PUBLICATIONS

Jojoyee, "Turn Your Android Device Into Ebook Reader for Free", Retrieved at <<http://www.techsupportalert.com/content/free-mobile-app-week-moon-reader-android.htm>>, Jul. 2012, pp. 2.

"3D Page-Flipping e-book Viewer and Web Browser", Retrieved from <http://teck.in/3d-page-flipping-e-book-viewer-and-web-browser-download-flipviewer.html> on May 30, 2012, (Sep. 15, 2011), 3 pages.

"Page Rendering Techniques on iPad Magazines", Retrieved from <http://www.viggiosoft.com/blog/blog/2012/07/24/page-rendering-techniques-on-ipad-magazines/> on Oct. 18, 2012, (Jul. 24, 2012), 8 pages.

Boulanger, Catherine N., "Device Having Variable-Input Selector for Electronic Book Control", U.S. Appl. No. 13/683,984,(Nov. 21, 2012), pp. 1-38.

Boulanger, Catherine N., "Electronic Book Navigation", U.S. Appl. No. 13/683,876,(Nov. 21, 2012), pp. 1-37.

Boulanger, Catherine N., et al., "Bookmarking for Electronic Books", U.S. Appl. No. 13/683,784,(Nov. 21, 2012), pp. 1-38.

Danigelis, Alyssa "E-Reader Lets You Physically Turn the Page", Retrieved from <http://news.discovery.com/tech/ebook-paranga-010612.html> on May 31, 2012, (Jan. 6, 2012),10 pages.

Horsey, Julian "New Multi-Touch Smart eBook Interface Concept Demonstrated on Apple's iPad", Retrieved from <http://www.geeky-gadgets.com/new-multi-touch-smart-ebook-interface-concept-demonstrated-on-apples-ipad-video-23/01/2012/> on May 30, 2012, (Jan. 23, 2012), 5 pages.

Pinkney, et al., "Reflowable Documents Composed from Pre-rendered Atomic Components", *In the proceedings of the 11th ACM symposium on Document engineering*, Retrieved from <http://www.cs.nott.ac.uk/~azp/papers/docn55s-pinkney.pdf>,(Sep. 19, 2011), 4 pages.

Saya, "Paper Book-Like E-reading System", Retrieved from <http://www.inewidea.com/2012/01/16/43787.html> on May 30, 2012, (Jan. 6, 2012), 3 pages.

Spencer, Spanner, "How to Send Documents to the Kindle iPhone App", Retrieved from <http://smallbusiness.chron.com/send-documents-kindle-iphone-app-28031.html> on May 30, 2012, 4 pages.

Spencer, Spanner "Kindle Tutorial", Retrieved from <http://www.ehow.com/how_7432085_kindle-tutorial.html> on Oct. 19, 2012, (Apr. 16, 2012), 3 pages.

Sun, et al., "Flipper: a New Method of Digital Document Navigation", *In the proceeding of CHI '05 Extended Abstracts on Human Factors in Computing Systems*, Retrieved from <http://www.cs.cornell.edu/~francois/papers/flipper.pdf>,(Apr. 2, 2005), 4 pages.

Sun, et al., "Flipper: a New Method of Digital Document Navigation", *CHI 2005*, Retrieved from <http://www.cs.cornell.edu/~francois/papers/flipper.pdf>,(Apr. 2, 2004), 4 pages.

Tajika, et al., "Intuitive Page-turning Interface of E-books on Flexible E-paper based on User Studies", *In 16th ACM international conference on Multimedia*, Retrieved from <http://kusu.comp.nus.edu.sg/proceedings/mm08/mm/p793.pdf>,(Oct. 26, 2008), 4 pages.

Tony "Smart E-book System—Page flipping on an ereader brought to new heights—Koreans come up with whole new approach.", Retrieved from <http://www.ebookanoid.com/2012/01/27/smart-e-book-system-page-flipping-on-an-ereader-brought-to-new-heights-koreans-come-up-with-whole-new-approach/> on Oct. 19, 2012, (Jan. 27, 2012), 5 pages.

"Final Office Action", U.S. Appl. No. 13/683,984, Dec. 2, 2014, 35 pages.

"International Search Report and Written Opinion", Application No. PCT/US2013/071065, Mar. 4, 2014, 11 pages.

"International Search Report and Written Opinion", Application No. PCT/US2013/071070, May 9, 2014, 16 Pages.

"International Search Report and Written Opinion", Application No. PCT/US213/071069, Mar. 24, 2014, 9 pages.

"International Search Report and Written Opinion", Application No. PCT/US2013/070855, Apr. 16, 2014, 9 pages.

Baig, et al., "iPad for Dummies", 4th Edition, John Wiley & Sons, Inc., May 2012, 4 pages.

Gou, et al., "SNDocRank: a Social Network-Based Video Search Ranking Framework", In Proceedings of the International Conference on Multimedia Information Retrieval, Mar. 2010, 10 Pages.

"Non-Final Office Action", U.S. Appl. No. 13/683,984, Jul. 1, 2014, 24 pages.

"Corrected Notice of Allowance", U.S. Appl. No. 13/683,984, Sep. 4, 2015, 4 pages.

"Non-Final Office Action", U.S. Appl. No. 13/683,784, Aug. 13, 2015, 14 pages.

(56) References Cited

OTHER PUBLICATIONS

"Non-Final Office Action", U.S. Appl. No. 13/683,876, May 22, 2015, 19 pages.
"Notice of Allowance", U.S. Appl. No. 13/683,984, Jul. 7, 2015, 6 pages.
"Final Office Action", U.S. Appl. No. 13/683,784, Feb. 3, 2016, 15 pages.
"Final Office Action", U.S. Appl. No. 13/683,876, Dec. 3, 2015, 22 pages.
"Foreign Notice of Allowance", EP Application No. 13805641.1, Nov. 9, 2015, 8 pages.
"Foreign Office Action", EP Application No. 13805646.0, Dec. 17, 2015, 6 pages.
"Foreign Office Action", EP Application No. 13805648.6, Dec. 8, 2015, 4 pages.
"Notice of Allowance", U.S. Appl. No. 13/683,784, Jul. 15, 2016, 16 pages.
"Non-Final Office Action", U.S. Appl. No. 13/683,876, Jun. 15, 2016, 26 pages.
"Final Office Action", U.S. Appl. No. 13/683,876, Dec. 19, 2016, 26 pages.
"Foreign Office Action", CN Application No. 201380060668.9, Mar. 27, 2017, 13 pages.
"Foreign Office Action", CN Application No. 20138060650.9, Apr. 12, 2017, 14 pages.
"Foreign Office Action", CN Application No. 201380060640.5, Mar. 29, 2017, 16 pages.

* cited by examiner

AFFINITY-BASED PAGE NAVIGATION

BACKGROUND

Current electronic-book-reading devices often fail to enable users to easily navigate through an electronic book (e-book). Consider, for example, three typical navigation interfaces common to current e-book-reading devices. In the first, the e-book-reading device enables a user to turn a page of an electronic book, such as with a tap or swiping gesture, one page at a time. While this permits navigation, it is slow and ponderous. In the second, the e-book-reading device enables a user to select a contents page from which to then select a chapter of the electronic book. After selecting the chapter, the e-book-reading device presents the first page of the selected chapter. While generally faster than page-by-page selection, this can also fail to enable the user to quickly find a desired page, such as when the user does not remember which chapter a desired page is within or when the user does not want to navigate to a chapter's first page, but instead to some portion of the chapter.

In the third navigation interface common to e-book-reading devices, the e-book-reading device enables the user to select a search term and then scan through various pages having the selected search term. This often fails the user, such as when the selected search term is too common to enable quick navigation or when the user does not remember terms on the desired page. Even in cases where using a search term enables the user to scan through a reasonable number of pages, the user still has to select the search term, often through a typing interface. Thus, even when fairly useful, navigation through search terms can be unacceptably slow and ponderous due to needing to select the term. Thus, current e-book-reading devices often fail to enable users to easily navigate an electronic book.

SUMMARY

This document describes techniques and apparatuses that enable navigating, bookmarking, and/or using selectors to control electronic books and other media. In some embodiments, these techniques and apparatuses enable affinity-based page navigation, such as page flipping, page searches, and other navigation based on affinities associated with various pages. These affinities can include a reference to a page, such as a link or quotation in a social networking service, an encyclopedia, a webpage, an article, a newspaper, or a blog. These affinities can also or instead include usage, such as how many users have read, highlighted, dog-eared, or bookmarked a page.

This summary is provided to introduce simplified concepts for affinity-based page navigation, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses enabling navigating, bookmarking, and/or using selectors to control electronic books are described with reference to the following drawings. The same numbers are used throughout the drawings to reference like features and components.

DETAILED DESCRIPTION

Overview

Figure 1:
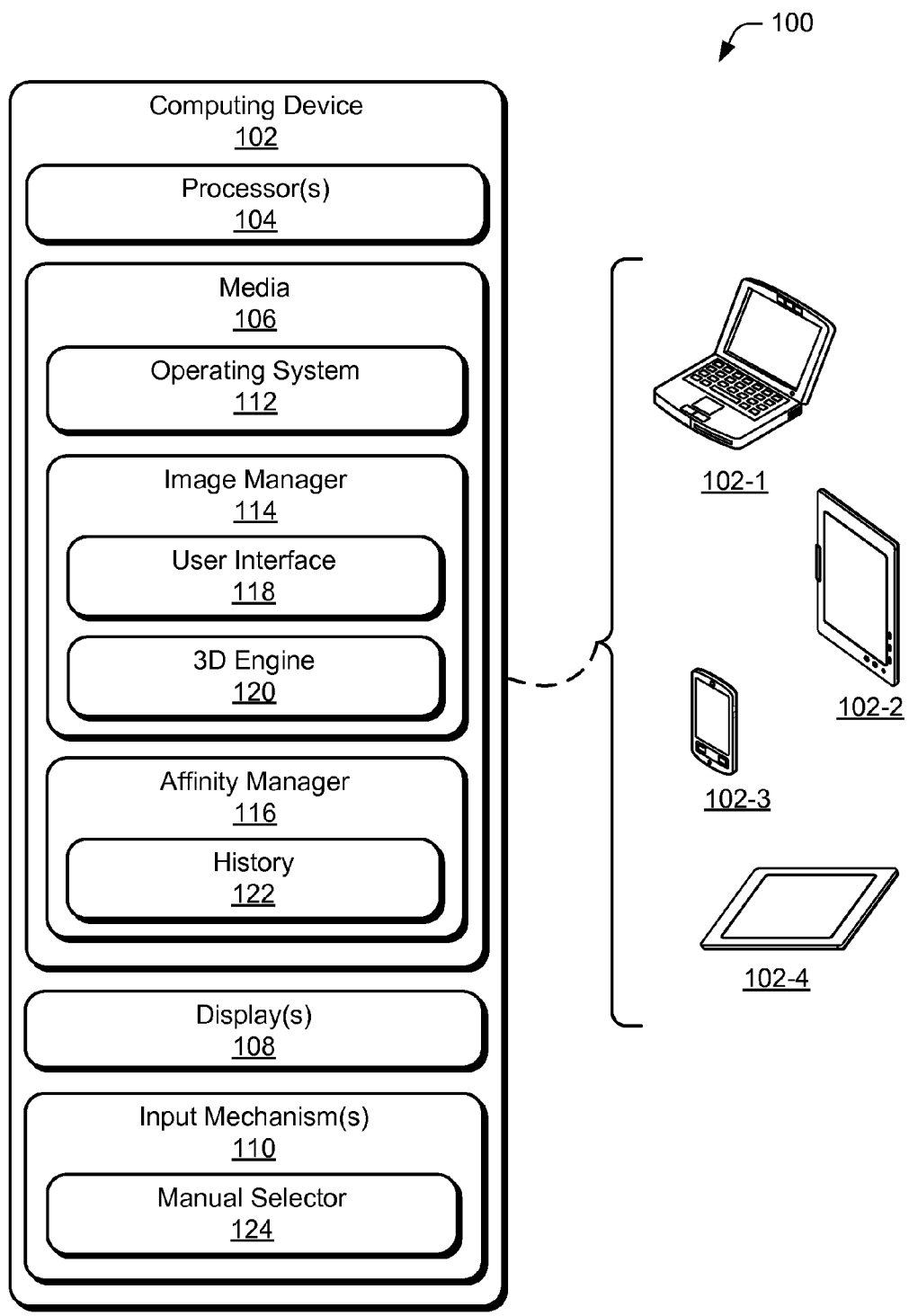
FIG. 1 illustrates an example system in which techniques enabling navigating, bookmarking, and/or using selectors to control electronic books can be implemented.

This document describes techniques and apparatuses enabling navigating, bookmarking, and/or using selectors to control electronic books and other media. Consider, for example, a traditional paper-and-cover book. A user can easily discern the size of the book based on its thickness. And a user may quickly scan through pages of this book by bending the pages and releasing the pages so that the pages flip past. Assume a user remembers that he or she is looking for an illustration in a reference manual. The user does not care about, or remember, the title of the chapter in which the illustration can be found. The user may also not remember possible search terms and the like. But the user may remember that the illustration is towards the back of the book, for example. In such a case, the user may pick up the book, flip pages starting at about one third or one quarter from the end of the book, and then, when the illustration flips past, stop at or near the desired page. Thus, a traditional paper book enables a user to start at an arbitrary page (the page at about one third or one quarter from the back), quickly scan pages as they flip past, and then find the desired page through a human's natural and excellent pattern-recognition capability.

Furthermore, if the page having the illustration has been looked at previously, the binding of the traditional paper book often has some memory of that page due to the binding being bent open at that page. Because of this "memory" in the binding, the page may not flip as quickly as other pages. Contrast these affordances with those of current e-book-reading devices, which have few if any of these affordances.

The present disclosure describes an e-book-reading device that enables many traditional book affordances for electronic books. By so doing, many of the conveniences of an e-book-reading device can be combined with the traditional affordances of paper books. In one embodiment, a tablet-like e-book-reading device includes manual selectors that enable a variable and tactile selection of pages of an electronic book, such as flipping through pages slowly or quickly based on the manual selection. These manual selectors include a flexible tab, a brush, a flexible casing of the e-book-reading device, or a toggle selector, for example. This e-book-reading device may preload images approximating pages of an electronic book so that a user may quickly and easily scan through the pages, thereby using object recognition to find a desired page. Alternatively or additionally, the techniques also enable navigation based on affinities associated with pages, such as a page that is referenced or often accessed by other readers or a current reader.

These are but few examples of how the techniques and/or apparatuses enable navigating, bookmarking, and using selectors to control electronic books and other media. These techniques and/or apparatuses are referred to herein separately or in conjunction as the "techniques" as permitted by the context. This document now turns to an example environment in which the techniques can be embodied, follows with an example device having manual selectors usable to select, control, bookmark, and flip through pages of an electronic book, then turns to various example methods for performing the techniques, after which another example device in which the techniques may be embodied is described.

Example System

FIG. 1 illustrates an example system 100 in which techniques enabling navigating, bookmarking, and/or using selectors to control electronic books can be embodied. System 100 includes a computing device 102, which is illustrated with four handheld examples: a laptop computer 102-1, a tablet computing device 102-2, a smart phone 102-3, and an electronic-book reader 102-4, though other computing devices and systems, such as desktop computers and netbooks, may also be used. Electronic book is a term representing many different types of articles, papers, books, comics, and the like. Any readable content or media capable of being arranged into pages can be considered an electronic book.

Computing device 102 includes computer processor(s) 104, computer-readable storage media 106 (media 106), display(s) 108, and input mechanism(s) 110. Media 106 includes an operating system 112, image manager 114, and affinity manager 116.

Image manager 114 is capable of enabling or aiding techniques described herein, including navigating, bookmarking, and using selectors to control electronic books. In some embodiments, image manager 114 pre-renders page images of an electronic book, receives selection to flip or scan through pages of the electronic book, and presents the pre-rendered page images.

Image manager 114 may pre-render full-resolution page images, low-resolution page images, approximations of high-resolution page images, or partial page images of the pages of the electronic book. For approximations, image manager 114 can pre-render pages with illustrations but forgo pre-rendering actual images of pages that do not include illustrations, instead pre-rendering or assigning approximations of text pages. These approximations are intended to be shown quickly as part of a rapid succession of page images and thus need not present actual text but instead a page that shows the approximate amount and location of text and whitespace, or even just one of a previously prepared set of pages images used at random or by a closest match to an actual page of text.

Approximations can enable computing device 102 to quickly present, and often without using substantial computing resources, a flip through of page images while permitting a user to find a desired page. This is due in part to many users using pattern recognition to find a desired page, such as one with an illustration or with a particular arrangement of text (e.g., a page with a list, a table, or that is half empty).

Image manager 114 may also include or have access to user interface 118 and three-dimension engine 120 (3D engine 120). 3D engine 120 enables image manager 114 to present, in user interface 118 on display 108, the pre-rendered page images noted above but approximating a paper page's movement of a paper book in three dimensions.

Image manager 114 is not required to present a flip of pages in three dimensions, however. Image manager 114 may instead present the page images as flat, two-dimensional images, for example. In either case, image manager 114 also may display a beginning and ending thickness of the electronic book. This beginning and ending thickness can approximate a location in the electronic book of a currently displayed page during a flip of pages. Thus, image manager 114 may present the flip-through of pre-rendered page images and, during the flip, alter the beginning thickness and the ending thickness based on a number of the multiple pages being presented and the number remaining in the electronic book. By so doing, image manager 114 illustrates for the user where the presented page is in the electronic book.

Affinity manager 116 is capable of assigning or determining that a page of an electronic book has an affinity, as well as other capabilities described herein. In some cases this affinity is based on a history 122 associated with the electronic book. History 122 can include references to a page by the user or other users. References include, for example, a link to, or quotation from, a page from various sources, such as social networking services, definition and encyclopedic books and webpages, published articles, newspapers, and blogs to name but a few. History 122 can also or instead include usage by the user or other users, such as whether (or how many users have) accessed (e.g., read or viewed), highlighted, dog-eared, or bookmarked a page.

Some actions by the user of computing device 102 can also be recorded in history 122, such as whether the user selected to view the page two or more times, that the page was the last page viewed by the user (e.g., the last time the user read the book), or that the user spent an amount of time significantly higher than an expected amount of time to read the page (e.g., the user carefully studied the page). Thus, affinity manager 116 may assign an affinity to a page of a novel having an often-cited quotation, a reference manual referenced by an online dictionary or encyclopedia, or a graphic novel bookmarked by the user, for example. Ways in which an affinity are assigned, determined, and used are set forth in greater detail elsewhere herein.

As noted above, computing device 102 includes or has access to one or more displays 108 and input mechanisms 110. Four example displays are illustrated in FIG. 1, all of which are integral with their respective device, though this is not required. Input mechanisms 110 can include gesture-sensitive sensors and devices, such as touch-based sensors and movement-tracking sensors (e.g., camera-based), as well as mice (free-standing or integral with a keyboard), track and touch pads, capacitive sensors (e.g., on a surface of computing device 102), and microphones with accompanying voice recognition software, to name a few. Input mechanisms 110 may be separate or integral with display 108; integral examples include gesture-sensitive displays with integrated touch-sensitive or motion-sensitive sensors. By way of example, input mechanism 110 can include pressure-dependent sensors capable of measuring pressure made on, behind, or near display 108. This permits a user to press or squeeze display 108 to input a selection, such as to bookmark or flip pages, which may vary as noted for manual selectors 124 through an amount of pressure sensed.

Input mechanism 110 may also include one or more manual selectors 124. Manual selector 124 enables manual selection of multiple different inputs. In one case, manual selector 124 is a variable-input manual selector integral with a casing surrounding, or integral with, display 108. The variable-input manual selector is capable of receiving different selections through multiple implements or a same implement, the different selections differing, in some embodiments, based on a bend or force applied.

In another case, manual selector 124 is a tactile (e.g., rubber-like) edge of a casing of computing device 102, which can permit variable selections (e.g., non-binary) but is not required to be variable. Further, this tactile edge may vary based on an amount of flex (e.g., how far it is bent), which may or may not vary based on a force applied.

In still another embodiment, manual selector 124 includes a brush. This brush can extend or be integral with an edge of display 108 of computing device 102, though it may instead be a separate controller, such as a gaming controller or part of a mouse device. It can receive variable selections, such as slow flip, fast flip, or reverse flip of pages, for example, based on an amount that the brush fibers are bent, how fast fibers of the brush are released from the bend, and so forth.

Each of these and other embodiments of manual selector 124 may include sensors to sense a user's selection, such as piezo-based sensors (e.g., those having a piezo-electric crystal) for sensing vibration, flex sensors measuring an amount of bend, stress or strain sensors measuring force applied, capacitive sensors measuring touch and location of the touch, hall-effect sensors to measure proximity, resistive sensors, and so forth. Detailed examples of manual selector 124 are set forth below.

Figure 2:
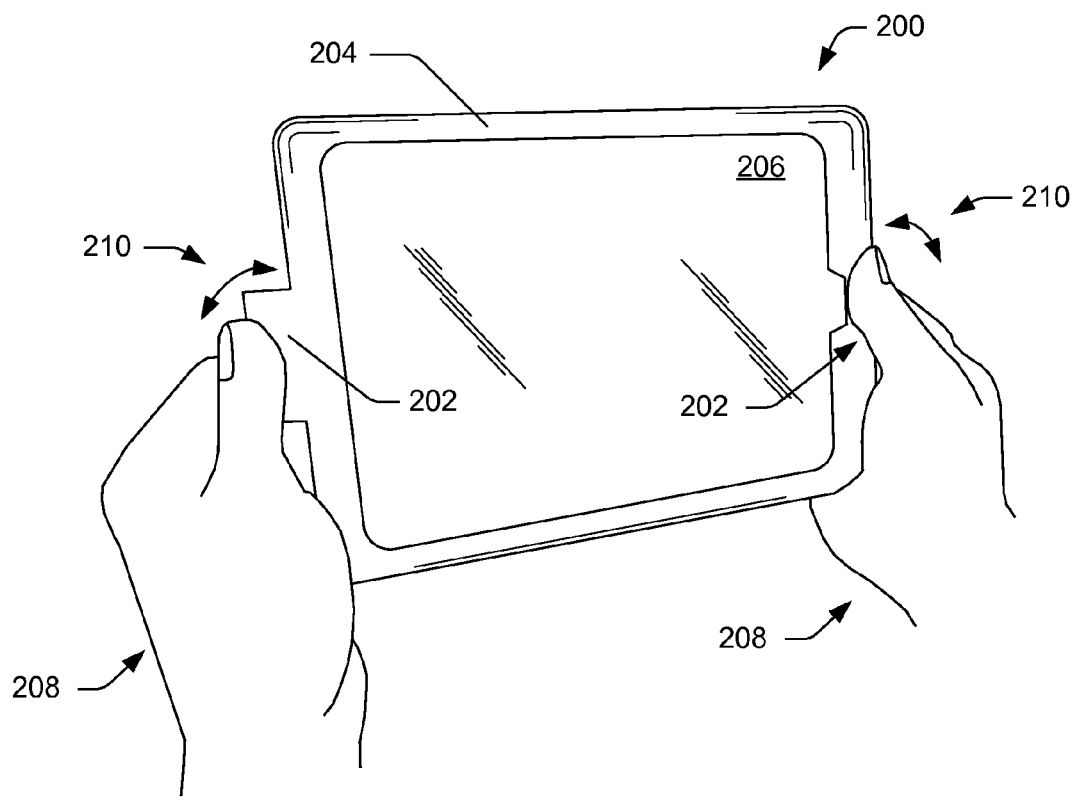
FIG. 2 illustrates an example e-book-reading device of FIG. 1 having variable-input tabs.

Consider FIG. 2, which illustrates example e-book-reading device 200 having variable-input tabs 202. Variable-input tabs 202 are integral with casing 204, which surrounds display 206. As shown, a user's hands 208 may select, through a bend 210 applied to either or both of variable-input tabs 202, to flip though pages of an electronic book presented on display 206. Note also that the user, through forces or an amount of bend applied to variable-input tabs 202, may select to slow, speed up, stop, or reverse a flip-through of pages presented on display 206.

These variable-input tabs 202 permit multiple inputs through a same implement (each of variable-input tabs 202 is an implement). Note that this variable input can be a bend or force; each of variable-input tabs 202 can be more difficult to bend the farther it is bent, and thus the variability be either or both of the bend and the force applied to cause the bend. Each of variable-input tabs 202, however, may not be more difficult to bend the farther it is bent, in which case the amount of bend can be used to determine a selection being made. Ways in which this is enabled are set forth in greater detail below.

Other example manual selectors, like the variable-input tabs 202, include those capable of sensing varying selections (e.g., force, flex, toggle steps, release of fibers of a brush) to an implement within a range. The varying range can be continuous within a range or simply be two or more preset levels.

Implements capable of sensing varying selections include those that measure varying force, flex, proximity, and fiber releases, for example. Those capable of measuring variables in force applied include variable-input tabs 202 (which may or may not flex or be integral with casing 204), a rocker arm having continuous or preset force levels mapping to different selections (e.g., page-flip speeds), an edge on the device or casing around display 108, or the whole display casing itself, to name but a few. For the example of FIG. 2, the casing may surround display 206 or a portion thereof and be capable of sensing a force attempting to flex the casing (whether the casing is flexed or not).

Figure 3:
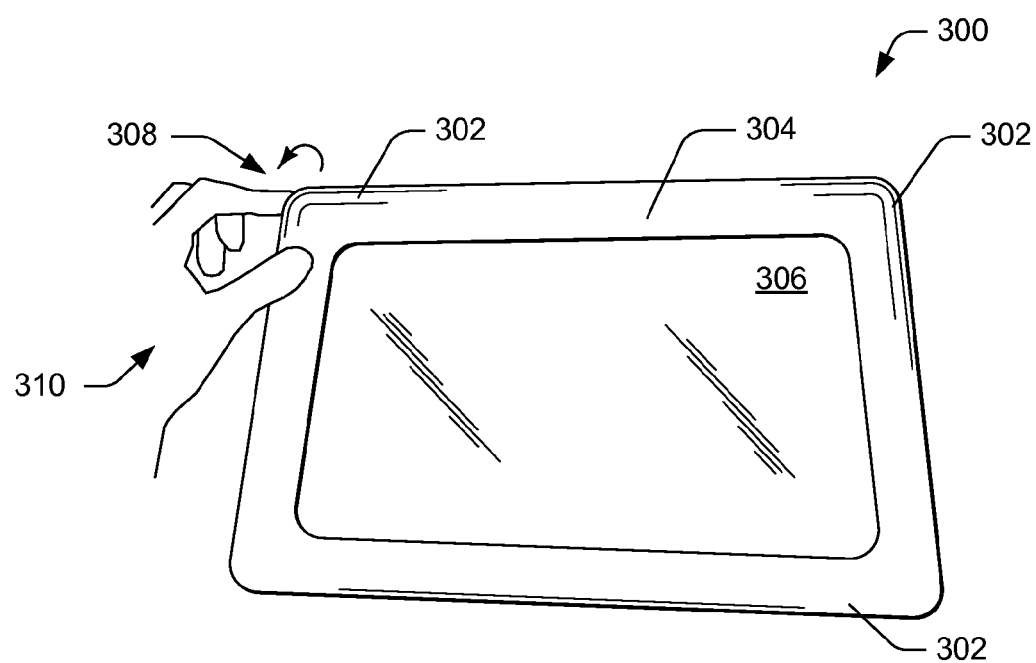
FIG. 3 illustrates an example e-book-reading device of FIG. 1 having a flex sensor integral with a casing that surrounds a display.
Figure 3:
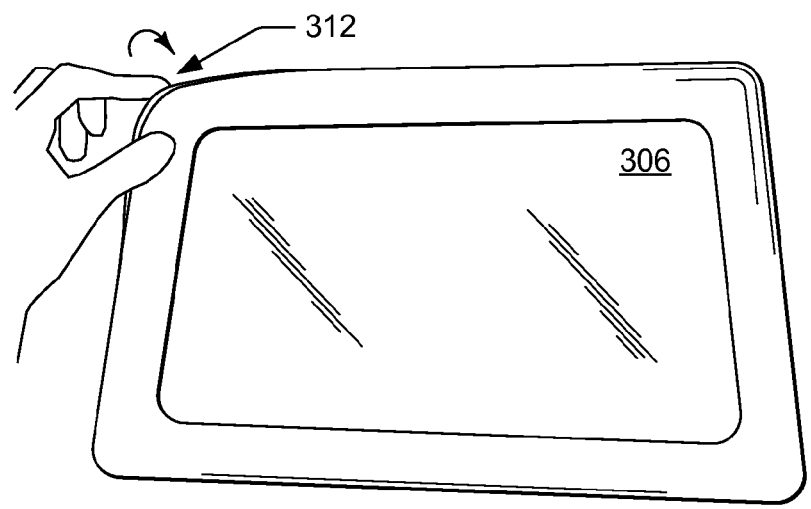

By way example, consider FIG. 3, which illustrates an example e-book-reading device 300 having a flex sensor 302 integral with a casing 304 that surrounds display 306. FIG. 3 illustrates flex sensor 302 flexed in two opposing positions. A corner portion of flex sensor 302 is shown flexed toward a front surface of display 306 to a bend-toward position 308. Bend-toward position 308 is a flex of flex sensor 302 by a user's hand 310 and likely toward the user's face (not shown) looking at display 306. The same corner portion of flex sensor 302 is also shown flexed away from display 306 to a bend-away position 312.

Flex sensor 302 surrounds display 306 in this example, though it may instead be at one or more discrete locations in casing 304. This flex sensor 302 can be easy and intuitive for a user of e-book-reading device 300 to use. A user may simply flex part of flex sensor 302 a particular direction to control presentation of content, such as an electronic book, on display 306 of e-book-reading device 300. Further, in some cases flex sensor 302 includes a texture to aid users, such as a rubber feel, tactile nibs, or bumps. Thus, a user wanting to control e-book-reading device 300 may feel for a rubber part of an edge of display 306, and flex that part to flip through pages, book mark a page, and so forth. Note that while many current control implements require a user to look for, find, and then carefully select the implement (e.g., a button or key), flex sensor 302 may be found and used without requiring a user to look for the implement.

Figure 4:
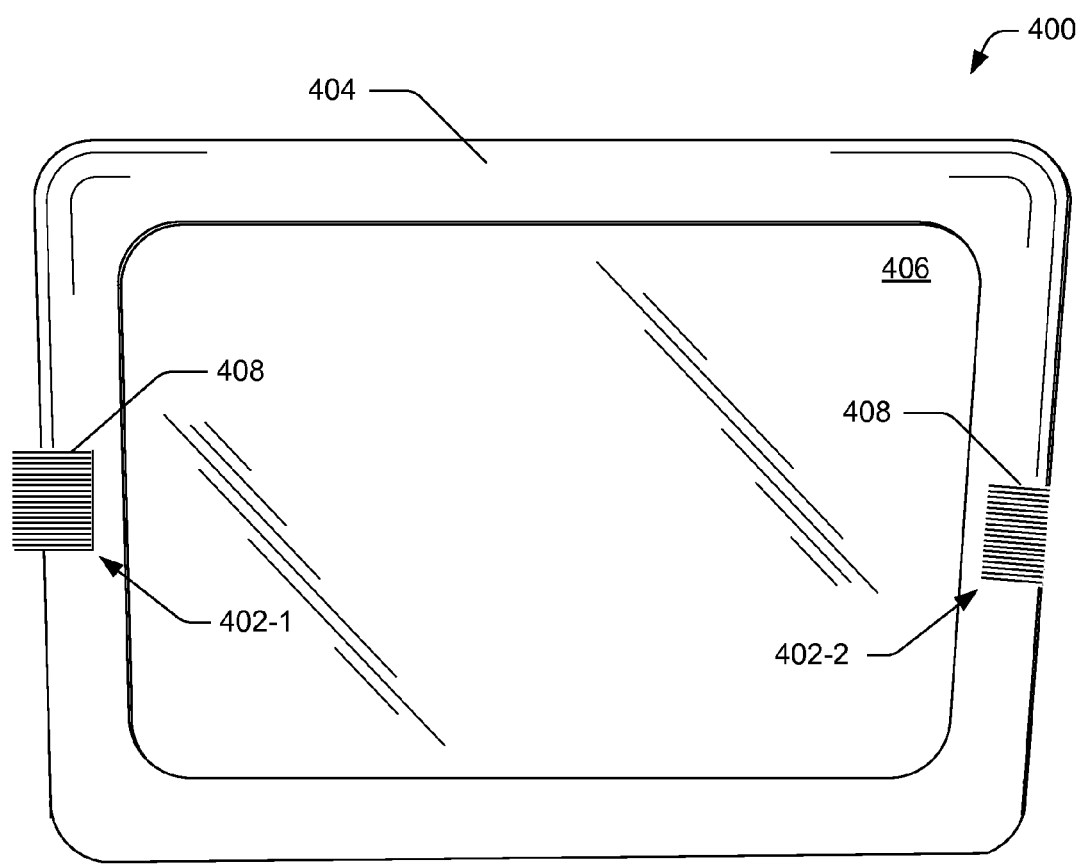
FIG. 4 illustrates an example e-book-reading device of FIG. 1 having brush selectors.

Consider also FIG. 4, which illustrates example e-book-reading device 400 having brush selectors 402. Brush selectors 402 are shown integral with casing 404, which surrounds display 406. Brush selector 402-1 is shown with fibers 408 jutting out from casing 404. Brush selector 402-2 includes fibers that do no extend past an edge of casing 404. Fibers 408 of brush selectors 402 may be manipulated to make multiple selections. A user may bend the fibers, and the more the fibers are bent, the more a selection is made. Thus, a large bend of the fibers can be determined and interpreted to mean that a fast flip of pages, for example, is desired. Alternatively, a number of fibers released from the bend, and the rate thereof, may be determined and interpreted as a fast, medium, or slow flip of pages is desired. Furthermore, a direction (toward a front of display 406 or away from this front) may be determined and interpreted, such as to flip forward or back. Note that fibers of a brush have some similarities to pages of a book—both give some resistance to being bent, both can be released partially and at varying rates, and so forth.

The above-illustrated variable-input tabs 202, flex sensors 302, and brush selectors 402 are but a few embodiments of manual selectors 124 of FIG. 1. Others, or a combination of these, may be used herein to enable navigation and other capabilities for electronic books and e-book-reading devices, including others set forth below.

As noted in part above, one or more of these example manual selectors are capable of receiving opposing selections through the same implement, the opposing selections based on an opposite force applied to the implement. Examples include bending a tab or brush or rotating a rocker arm in an opposite direction, thereby making a negative selection. Neutral selections may also be enabled, such as releasing a rocker arm or tab to a neutral position but maintaining contact with the implement or holding the implement at a constant position or force.

Example Methods

Methods illustrated in FIGS. 5, 6, 7, 9, 10, and 11, are described herein. The following description of these various methods makes reference to example system 100 of FIG. 1 and example devices illustrated in FIGS. 2, 3, 4, 8, and 12. Reference is made to this system and these devices for example only and not for limitation. Further, each of the described methods may operate alone or in combination with other methods, whether in whole or in part.

Figure 5:
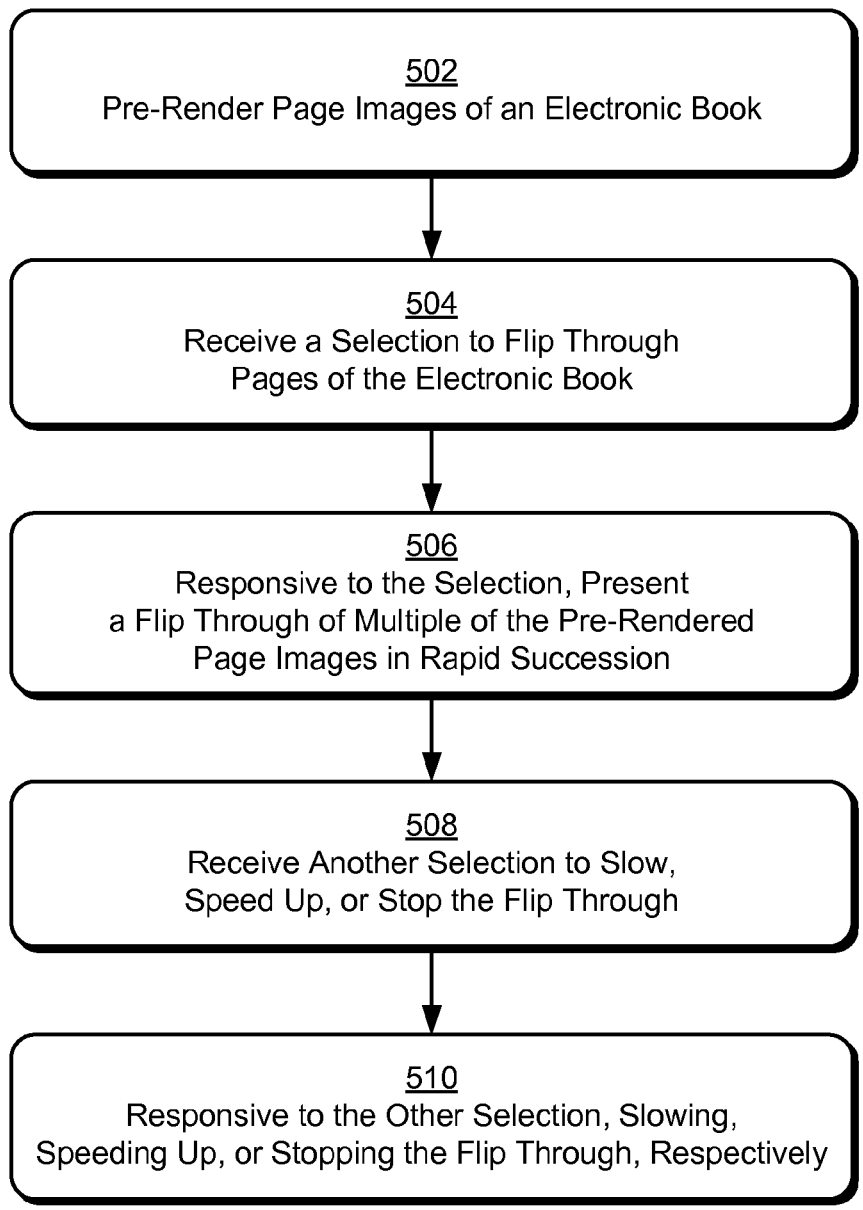
FIG. 5 illustrates example methods enabling electronic book navigation.

FIG. 5 illustrates example methods 500 that enable electronic book navigation. Block 502 pre-renders page images of an electronic book. Block 502 may pre-render pages in the various manners set forth above, such as by image manager 114 pre-rendering some page images as an approximation or low-resolution image and some others (such as ones with illustrations or that have an affinity) at full resolution of the page of the electronic book.

Block 504 receives a selection to flip through pages of the electronic book. The selection may be received in various manners described herein, such as through keyboards, mice, manual selectors, and gestures, e.g., a tap-and-hold to flip pages or a single finger slide to start a flip of multiple pages made on or over display 108. As part of an ongoing example, assume a bend is applied to one or both of variable-input tabs 202 of e-book-reading device 200 as shown in FIG. 2.

Block 506, responsive to the selection, presents a flip through of multiple of the pre-rendered page images in rapid succession. The rate of the flip though can be dependent on the amount bend applied or on a type of selection, such as one image per second for a slow flip and ten images per second for a fast flip. Thus, selection of a fast flip or a slow flip, or a pause or stop button may be received. While not required, image manager 114 may begin a flip through based on a default setting and then alter the rate if the bend, force, or other type of selection deviates from the default. In some cases computing device 102 is better able to quickly respond to a selection with a default rate rather than first determining the rate.

Figure 6:
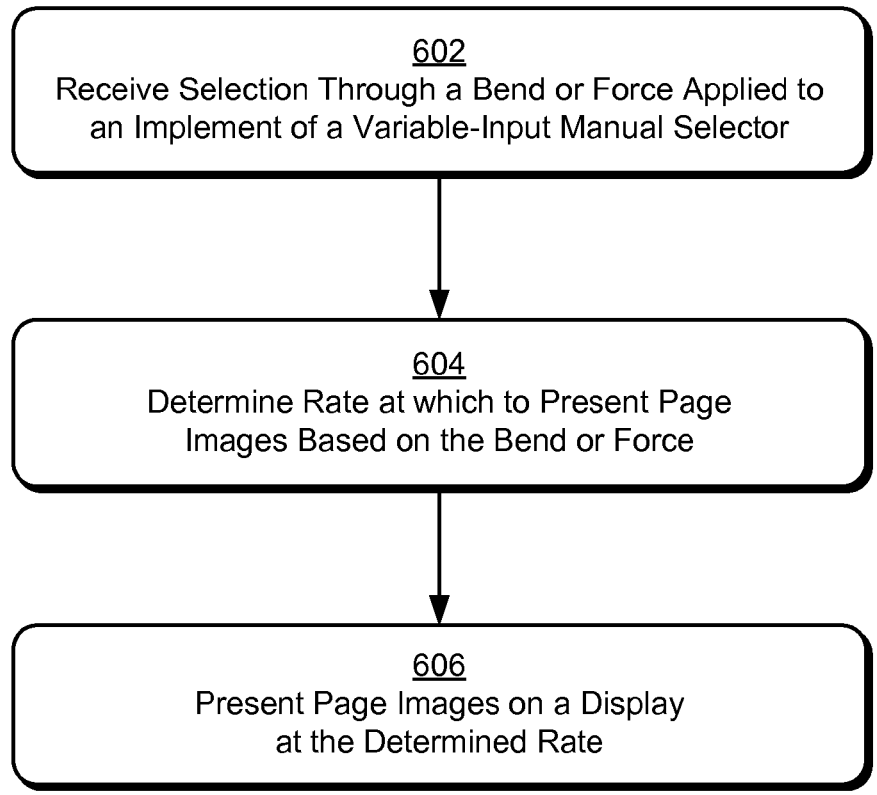
FIG. 6 illustrates example methods relating to a selection received through a variable-input manual selector.

Continuing the ongoing example, consider methods 600 of FIG. 6, which relate to a selection received through a variable-input manual selector. As noted above, methods 600 may operate, alternatively or additionally, with all or part of methods 500 of FIG. 5 and other methods set forth herein.

Block 602 receives a selection through an implement of a variable-input manual selector. The selection can be one of the multiple different selections capable of being received through the implement. Note that this selection may or may not be to flip through pages of an electronic book, such that for block 504 of FIG. 5, though for this example assume that the selection is to flip through pages.

Block 604 determines, here through image manager 114, a rate at which to present page images based on the bend or force applied. Image manager 114 and/or input mechanism 110 may determine this bend or force applied, or it may be received without needing determination. In this example, a bend is applied to variable-input tabs 202. Image manager 114 determines the rate to be approximately proportional to the force used to make this bend, the rate based on a previously determined mapping between the force and the determined rate. Image manager 114 may maintain the rate of the flip through based on the force or bend being maintained on variable-input tabs 202 (though this is not necessarily required).

Block 606 presents page images on the display and at the rate, the rate based on the selection. Block 606 may operate similarly to block 506 of FIG. 5, though block 606 may operate to present page images slowly and/or not responsive to a selection to flip through pages and/or without presenting pre-rendered page images. Concluding this example, the bend or force applied is used to determine the rate of page flipping, which may be slow, such as a page per second, or rapid.

Returning to FIG. 5, methods 500 may proceed, after presenting at block 506, to blocks 508 and 510. Block 508 receives another selection, the other selection to slow, speed up, stop, or reverse the flip through. This other selection can be a selection received through a different manner, such as a different gesture, a different button, or through a different implement of a manual selector, or can be an alteration to a variable selection being maintained, such as to reduce, reverse, or increase a force, flex, or bend being applied. This alteration can be to a same implement as that of the selection at block 504 (or block 602). In such a case, the selection can be determined based on a change from the current selection, such as a greater or lesser bend or force applied, and this change used to alter a presentation as noted below.

Block 510, responsive to the other selection or change, slows, speeds up, stops, or reverses the flip through, respectively. Concluding the ongoing example, assume that the user ceases to bend variable-input tabs 202, which is received as a selection at block 508. Block 510 then ceases to flip through the pages and stops at a page. Block 510 may stop at a page immediately responsive to receiving the selection.

Alternatively, block 510 may revert to a previously flipped page based on expected human or computer-based delay from when a page is presented to when the selection is made by the user and computed by the computing device. Thus, on receiving a selection to stop the flip, image manager 114 may revert back three pages, for example, based on that page being the page likely to have been viewed when the user determined to stop the flip based on the speed of the flip, a reaction time of the user, and a processing time of the computing device. Further, a return to a prior page may be based on that page having an affinity, such as one page of the last ten flipped pages being the only page having an affinity.

By way of another embodiment, consider FIG. 3. Assume that a flex is applied and maintained to flex sensor 302 during a flip through of the page images. Image manager 114 may determine a rate at which to flip through page images at block 506 based on how much flex sensor 302 is flexed, which may be independent of determining a force applied. Thus, the amount of flex, once determined, can be used to determine a rate at which to flip the pages. If less or more flex is applied, a slower or faster rate of page flipping, respectively, can be made, which can be determined at blocks 508 and/or 510 by image manager 114 of FIG. 1.

In still another embodiment, consider brush selectors 402 of FIG. 4. Here assume that a bend of a particular magnitude is applied and, at least momentarily, maintained to fibers 408 of brush selectors 402. Based on this magnitude, or in some cases irrespective of the magnitude, image manager 114 determines, at block 604, a rate at which to present page images on display 406. The magnitude, in some cases, need not be determined. Instead, a rate at which fibers are released (which may depend on the bend, but does not have to) is determined. This rate can be sensed using piezo-electric sensors capable of determining vibrations caused by the fibers being released. Furthermore, the rate at which the fibers are released may be slowed or speeded up by a user, which image manager 114 may determine, at blocks 508 and/or 510, thereby slowing or speeding up (or even stopping) the page flipping. Like an actual paper book, pages can be flipped by a user using brush selectors 402, with some number of fibers released similar to a page begin released when a user of a paper book bends and releases pages.

Figure 7:
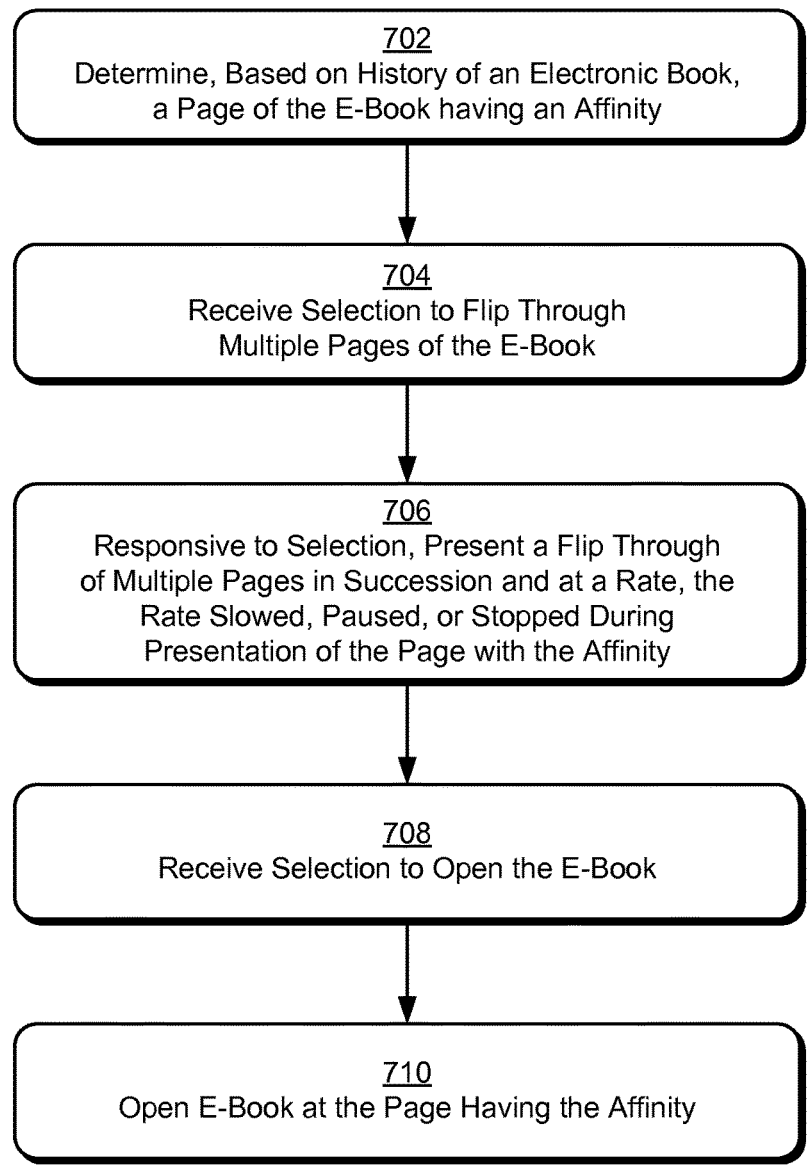
FIG. 7 illustrates example methods for navigating an electronic book including based on an affinity for a page of the electronic book.

FIG. 7 illustrates example methods 700 for navigating an electronic book, including navigating based on affinities of pages of the electronic book. Block 702 determines, based on a history of an electronic book, a page of the electronic book having an affinity. As noted above, this affinity can be determined, such as by affinity manager 116 of FIG. 1, based on one or a combination of references or usages.

Figure 8:
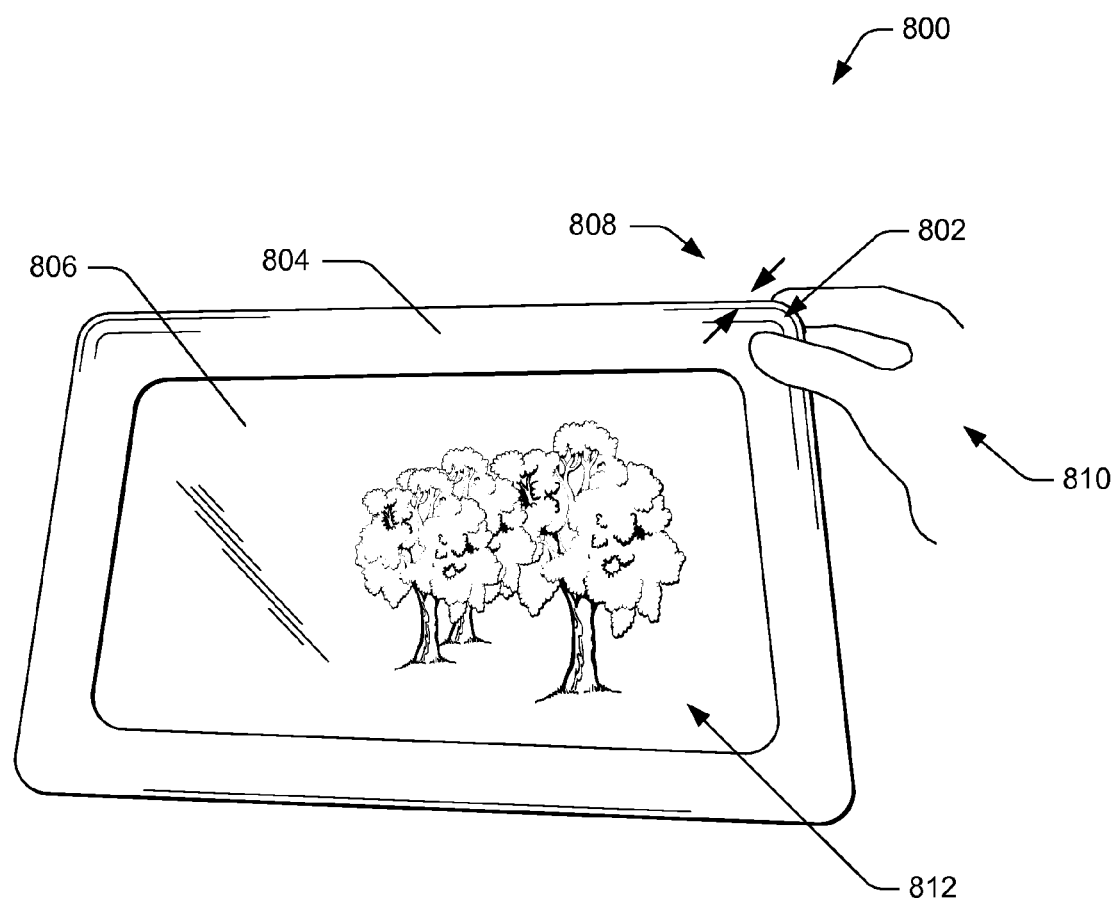
FIG. 8 illustrates a handheld computing device having a bookmark selector.

Consider one type of affinity, for example, at FIG. 8, which illustrates a handheld computing device 800. Handheld computing device 800 includes a bookmark selector 802 on a corner of, and integral with, a casing 804, which surrounds display 806. Bookmark selector 802 is capable of sensing a squeeze 808, such as from a user's finger and thumb 810, a bend of bookmark selector 802 away from display 806, and a bend of bookmark selector 802 toward display 806. For this example, assume that a user bookmarks a page currently presented on display 806 by squeezing bookmark selector 802.

Prior to block 702 acting, assume that a user was reading an illustrated page 812 of an electronic book on handheld computing device 800. The reader bookmarks the page by squeezing bookmark selector 802, which affinity manager 116 records in history 122 (both shown in FIG. 1). At block 702, affinity manager 116 and/or image manager 114 determine that illustrated page 812 has an affinity—in this case an affinity based on being bookmarked. For more details on bookmarking, see methods 900 and 1000 below.

Block 704 receives a selection to flip through multiple pages of the electronic book. This reception can be received in the various manners noted above as well as with a simple selection to flip pages—even through a binary selector such as a capacitive sensor, button, or gesture.

Block 706, responsive to the selection, presents a flip through of the multiple pages of the electronic book in succession and at a rate, the rate slowed, paused, or stopped during presentation of the page of the electronic book having the affinity. As noted above, image manager 114 may alter the rate of the flip though, including based on affinities for various pages of the electronic book. Continuing the above-noted bookmarking example, image manager 114 slows, pauses, or stops at illustrated page 812 during a flip through of the electronic book.

Alternatively or in addition, and prior to one or more blocks of method 700 (or other methods herein), the techniques enable selection to open the electronic book at a page based on an affinity associated with the page. Thus, blocks 708 and 710 may be performed after block 702 and/or prior to block 704 or blocks 502 or 504 of methods 500, for example.

Block 708 receives a selection to open the electronic book. This selection can be received in various manners, such as a button or gesture tap on an icon for an electronic book or a selection at some point on a "binding" or representation of edges of pages in the book (e.g., at a middle point of a visual thickness of the book) presented on display 108.

Block 710 opens the electronic book to the page having the affinity. Thus, assume that a user selects an electronic book, selects to open to the electronic book at about ⅓ from the end, and selects to flip through pages of the electronic book from about ⅓ from the end toward the end. Image manager 114 may open the book at a page bookmarked by the user or often-cited or often-accessed (e.g., read or viewed) by other users. From this point the user may select to flip through the book, or possibly the page opened is the desired page.

Figure 9:
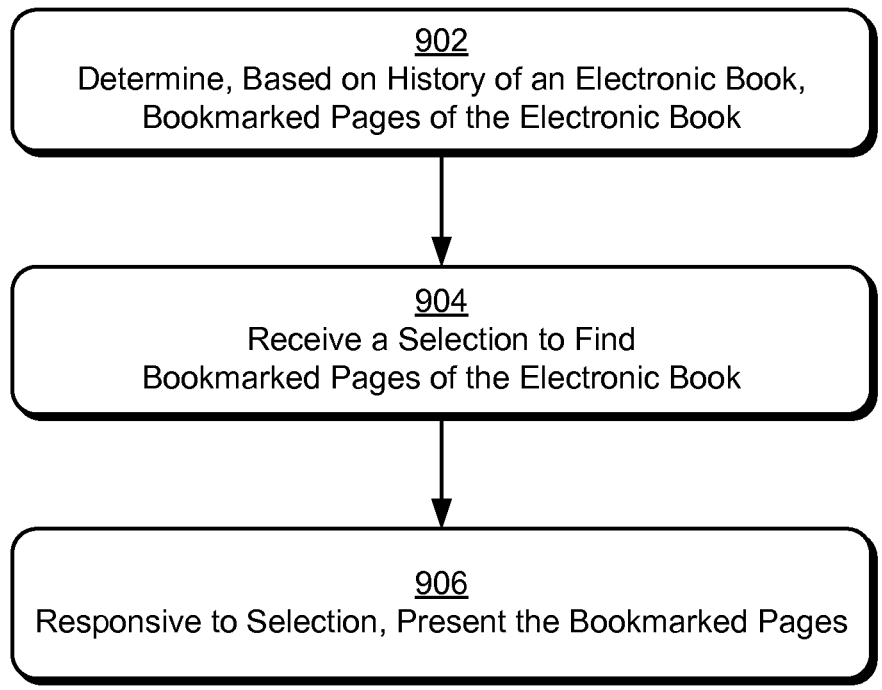
FIG. 9 illustrates example methods for bookmarking electronic books, including finding bookmarked pages.

Methods 900, 1000, and 1100 describe various uses of bookmarking, though other types of affinities may also or instead be used. FIG. 9 illustrates methods 900 for bookmarking electronic books, including finding bookmarked pages. Block 902 determines, based on a history of an electronic book, pages of the electronic book that have been bookmarked. This history may include history 122 of FIG. 1 as described above. In such a case, affinity manager 116 determines, from various data in history 122, which pages have been bookmarked by other (e.g., remote) users and/or a user of computing device 102 (e.g., a local reader of the electronic book). This bookmarking may be explicit by users or based on usage, such as where a user writes over or otherwise makes notes to a page of the electronic book.

Block 904 receives a selection to find bookmarked pages of the electronic book. This selection can be one of many set forth above, such as a particular gestures made on or over display 108 (e.g., a pinch gesture made to a corner of a currently displayed page to "crimp" or "dog-ear" the page or pressure made over, or a squeeze of, display 108 as noted above). Further, this selection to find bookmarked pages of the electronic book can be received through a same selector as a prior bookmarking of a page, though this is not required.

By way of example, reconsider FIG. 8, which illustrates handheld computing device 800 having bookmark selector 802. Assume for this example that a user selects to bookmark a page of the electronic book that is displayed on display 806 by squeezing bookmark selector 802. Affinity manager 116 may record this selection to bookmark the page of the electronic book and then record this in history 122. Assume that later the user selects to find bookmarked pages also through bookmark selector 802, such as with a bend toward display 806, away from display 806, or another squeeze.

Block 906, responsive to the selection to find bookmarked pages, presents the bookmarked pages. Block 906 may present these bookmarked pages in various manners set forth for presenting pages as noted above. Image manager 114 of FIG. 1, for example, may present a flip through of multiple pages of the electronic book in succession and at a rate, the rate slowed, paused, or stopped during presentation of the bookmarked pages. In so doing, image manager 114 may present unmarked pages, such as those that do not have an affinity or bookmark. Image manager 114, in some cases, presents a flip through of some but not all unmarked pages, such as pages showing a chapter or section headings or first page thereof prior to displaying a bookmarked page in that chapter or section. This provides context for a user when viewing the flip through.

Figure 10:
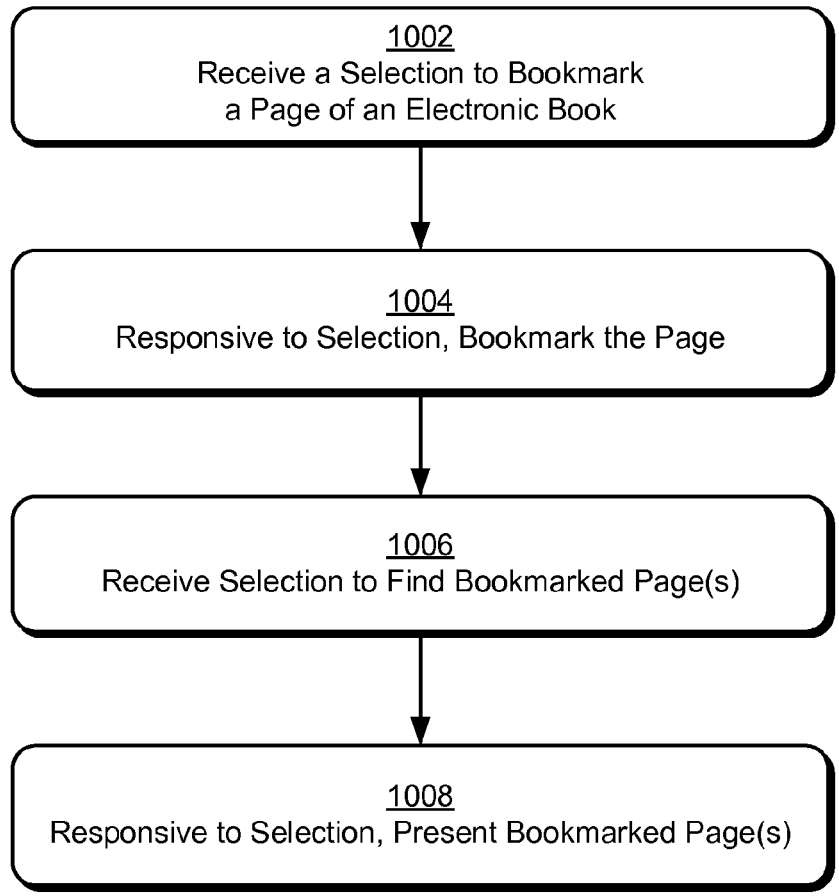
FIG. 10 illustrates example methods for bookmarking electronic books, including selections to bookmark pages and find bookmarked pages through a bookmark selector.

FIG. 10 illustrates methods 1000 for bookmarking electronic books, including selections to bookmark and find bookmarked pages through a same bookmark selector.

Block 1002 receives a selection through a bookmark selector to bookmark a page of an electronic book, the page of the electronic book currently displayed on a display. This selection can be made in one of many various input manners set forth herein. By way of one example, assume that affinity manager 116 of FIG. 1 receives, through a type of manual selector 124, such as variable-input tabs 202 of FIG. 2 or bookmark selector 802 of FIG. 8, a selection to bookmark a page by a bend to variable-input tab 202 or a squeeze of bookmark selector 802.

Block 1004, responsive to the selection, bookmarks the selected page. Continuing the ongoing embodiment, affinity manager 116 records the bookmarking of the page. Affinity manager 116 may do so through a metadata file associated with the electronic book, by altering or creating a history (e.g., history 122) associated with the electronic book, or in other manners that permit a future determination that a page has been bookmarked.

Block 1006 receives a selection through the bookmark selector to find bookmarked pages of the electronic book. Continuing the ongoing example, image manager 114 and/or affinity manger 116 receives the selection to find the bookmarked pages. These managers may search metadata files, history 122, and so forth to determine pages that have been bookmarked, such as the page bookmarked at block 1002, and/or other pages, such as those recorded in history 122 made by other users.

Note that the selection to find bookmarked pages can be received with or without the electronic book being closed or shut down. Thus, a user may bookmark pages, close the book, and come back months later to find the bookmarked pages. On reopening the book, methods 1000 may open the book to a bookmarked page, such as a first bookmarked page or a most-often bookmarked page. Or a user may bookmark pages and, with the electronic book still open, desire to scan through these bookmarked pages. Consider, for example, a student reading an electronic textbook and writing notes on various pages of the textbook effective to bookmark these pages at blocks 1002 and 1004. When still studying, the student may wish to scan through the bookmarked pages, and thus perhaps also her notes on those pages. This student's selection is received, after which block 1008 acts.

Block 1008, responsive to the selection to find bookmarked pages, presents, on the display, the bookmarked, selected page. This selection to find bookmarked pages can be received through a same implement or a same manual selector. Thus, a large bend of variable-input tab 202 of FIG. 2 or a squeeze to bookmark selector 802 may be used to bookmark a page. Later a same input or a different input, such as a small bend to variable-input tab 202 or a bend to bookmark selector 802 may be used to select to find those bookmarked pages.

Concluding the ongoing example, image manager 114 presents pages of the textbook on which the student wrote notes. Generally, image manager 114 may present other pages, just bookmarked pages, other pages with an affinity and in various manners set forth above, including through page flipping, delaying at bookmarked but not unmarked pages, and so forth.

By way of another example, assume that another student, over the course of a class that is weeks or months long, makes notes on pages of an electronic book, the novel *War and Peace*. Assume that she makes her notes over the pages of the novel that she thinks will be on the test, including when the professor discusses the novel in class. Assume also that she is gone one day but that she knows her friend took notes that day. She can ask her friend to share his notes with her and vice-versa. In response, affinity manager 116 receives a history for *War and Peace* from her friend and, when she selects to find bookmarked pages, presents not only her pages with her notes, but his pages with his notes as well. This is but one of the many ways that bookmarking and other types of affinity for pages can be used.

Figure 11:
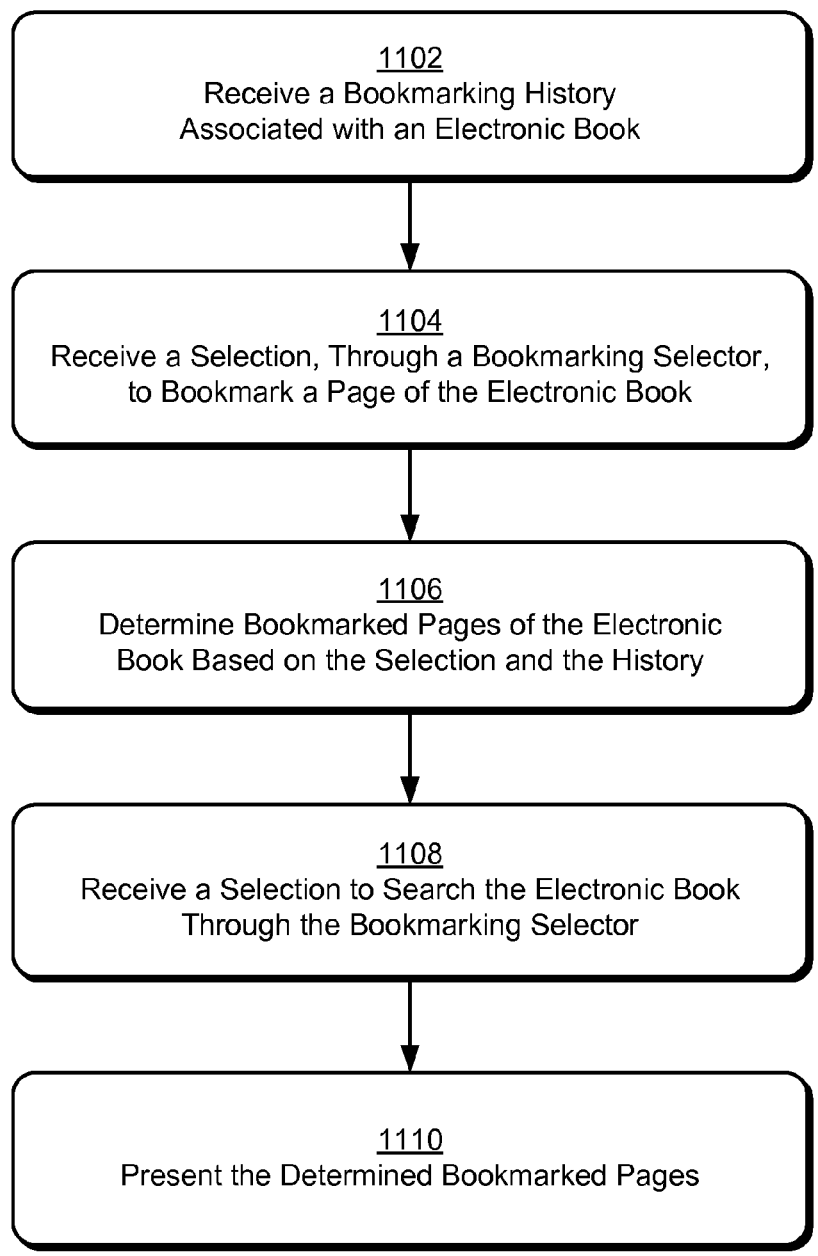
FIG. 11 illustrates example methods for bookmarking electronic books, including finding bookmarked pages bookmarked by other users.

FIG. 11 illustrates methods 1100 for bookmarking electronic books, including finding bookmarked pages bookmarked by other users. Block 1102 receives a bookmarking history associated with an electronic book, the bookmarking history indicating remotely bookmarked pages of the electronic book, the remotely bookmarked pages bookmarked by remote users or based on usage by remote users. This bookmarking history may be similar or the same as history 122 of FIG. 1, though it may also be used to build or alter history 122, such as in cases where history 122 includes bookmarks made by a user local to computing device 102. Further, this bookmarking history may be part of a larger history, such as a history including various types of metadata associated with the electronic book, including usage and references by a local user (e.g., the reader) and by remote users, as noted in part above. In such a case, block 1102 may determine, based on this bookmarking history, which of the pages of the electronic book have been bookmarked.

Block 1104 receives a selection through a bookmarking selector integral with a casing of the computing device, the selection to bookmark a page of the electronic book, such as a currently displayed page. This selection can be through the manners set forth herein. In one embodiment, the bookmarking selector is integral with the casing surrounding, or integral with, a display that is also associated with the computing device.

Block 1106 determines bookmarked pages of the electronic book. Block 1106 may determine the bookmarked pages of the electronic book based on the bookmarking history or a user's selection or both. Note also that the bookmarking history may include only the user's selection to bookmark or remotely bookmarked pages (e.g., from other users).

Block 1108 receives a selection to search the electronic book, the selection received through the bookmark selector integral with the casing of the computing device.

Block 1110, responsive to the selection to search the electronic book, presents the determined, bookmarked pages on the display.

Methods 1100 can be performed in various manners set forth above and in combination, in whole or in part, with other methods set forth herein. In one embodiment, for example, affinity manager 116 performs blocks 1002 to 1006 and works in conjunction with, or causes operations of, image manager 114 for performing blocks 1008 and 1110.

The preceding methods are shown as sets of blocks that specify operations performed but are not necessarily limited to the order shown for performing the operations by the respective blocks. Furthermore, these methods, in whole or in part, can be used in combination.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 12:
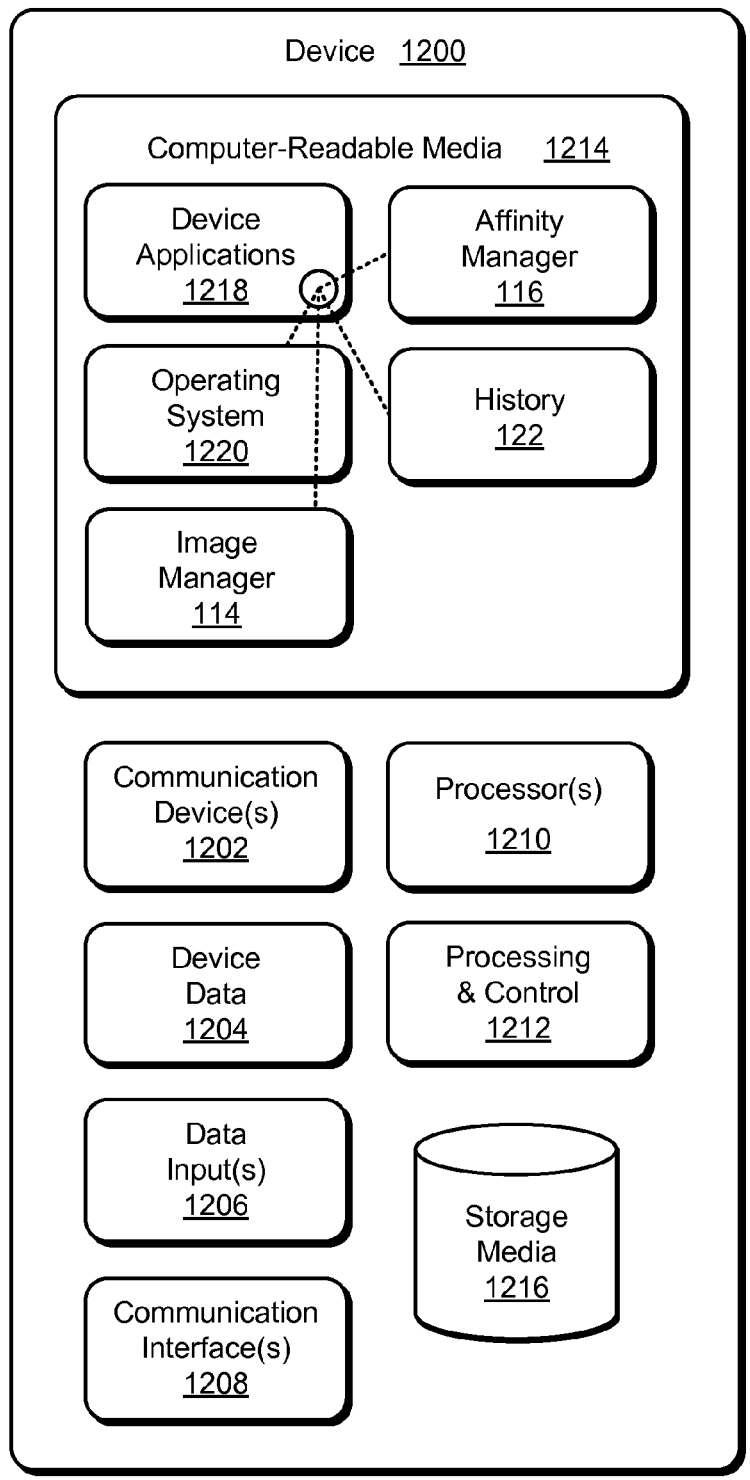
FIG. 12 illustrates an example device in which techniques enabling electronic book navigation, bookmarking for electronic books, affinity-based page navigation, and/or use of variable-input selectors for control of electronic books can be implemented.

FIG. 12 illustrates various components of example device 1200 that can be implemented as any type of client, server, and/or computing device as described with reference to the previous FIGS. 1-11 to implement techniques and/or apparatuses for navigating, bookmarking, and/or using selectors to control electronic books. In embodiments, device 1200 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1200 may also be associated with a user (e.g., a person) and/or an entity that operates the device such that a device describes logical devices that include users, software, firmware, and/or a combination of devices.

Device 1200 includes communication devices 1202 that enable wired and/or wireless communication of device data 1204 (e.g., received data, data that is being received, data scheduled for broadcast, data packets of the data, etc.). Device data 1204 or other device content can include configuration settings of the device, media content stored on the device, and/or information associated with a user of the device. Media content stored on device 1200 can include any type of audio, video, and/or image data (including images and/or audio for an electronic book). Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208, which can be implemented as any one or more of a serial and/or parallel interface, a wireless interface, any type of network interface, a modem, and as any other type of communication interface. Communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like), which process various computer-executable instructions to control the operation of device 1200 and to enable techniques for navigating, bookmarking, and/or using selectors to control electronic books. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable storage media 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable storage media 1214 provides data storage mechanisms to store device data 1204, as well as various device applications 1218 and any other types of information and/or data related to operational aspects of device 1200. For example, an operating system 1220 can be maintained as a computer application with the computer-readable storage media 1214 and executed on processors 1210. Device applications 1218 may include a device manager, such as any form of a control application, software application, signal-processing and control module, code that is native to a particular device, a hardware abstraction layer for a particular device, and so on.

Device applications 1218 also include any system components or modules to implement the techniques, such as image manager 114, affinity manager 116, and history 122.

CONCLUSION

Although embodiments of techniques and apparatuses enabling navigating, bookmarking, and/or using selectors to control electronic books and other media have been described in language specific to features and/or methods, it is to be understood that the subject of the appended claims is not necessarily limited to the specific features or methods described. Rather, the specific features and methods are disclosed as example implementations enabling navigating, bookmarking, and/or using selectors to control electronic books and other media.

What is claimed is:

1. A computer-implemented method comprising:
   determining, based on a history of an electronic book, a page of the electronic book having an affinity;
   receiving a selection to flip through multiple pages of the electronic book via a manual selector; and
   responsive to the selection, presenting a flip through of the multiple pages of the electronic book in succession and at a rate, the rate slowed, paused, or stopped during presentation of the page of the electronic book having the affinity, the presenting rendering the page of the electronic book having the affinity at full resolution and rendering other pages of the electronic book as an approximation, the presenting rendering the page of the electronic book having the affinity and the other pages at a same size.

2. A computer-implemented method as described in claim 1, wherein the history includes references made by other users, the other users other than a user associated with an e-book-reading device on which the method is performed.

3. A computer-implemented method as described in claim 2, wherein the references of the other users include reference to the page in a social-networking service.

4. A computer-implemented method as described in claim 2, wherein the references of the other users include reference to the page in an online encyclopedia or online dictionary.

5. A computer-implemented method as described in claim 2, wherein the references of the other users includes links to the page found on the internet.

6. A computer-implemented method as described in claim 1, wherein the history includes usage by other users, the other users other than a user associated with an e-bookreading device on which the method is performed, the usage of the other users including a number of persons that have read, highlighted, or bookmarked the page.

7. A computer-implemented method as described in claim 1, wherein the history includes usage or reference of a user of an e-book-reading device on which the method is performed or that is associated with the electronic book.

8. A computer-implemented method as described in claim 7, wherein the usage or reference of the user includes a previous selection by the user to highlight, bookmark, dog-ear, or otherwise mark the page.

9. A computer-implemented method as described in claim 7, wherein the usage or reference of the user includes selection to view the page two or more times.

10. A computer-implemented method as described in claim 7, wherein the usage or reference of the user includes an immediately prior viewing of the page.

11. A computer-implemented method as described in claim 7, wherein the usage or reference of the user includes selection to view the page an amount of time significantly higher than an expected amount of time to read the page.

12. A computing device comprising:
a display;
a manual selector;
one or more computer processors; and
computer-readable storage media having computer-executable instructions thereon, the instructions, when executed by the one or more computer processors, causing the computing device to perform operations comprising:
receiving a selection from the manual selector to open, or flip through pages of, an electronic book; and
responsive to the selection, presenting, on the display, a page of the electronic book having an affinity or a flip through of multiple pages of the electronic book, the flip through stopping, slowing, or pausing at one or more other pages of the electronic book based on affinities associated with the one or more other pages, the presenting rendering the page of the electronic book having the affinity at full resolution and rendering other of the multiple pages of the electronic book as an approximation, the presenting rendering the page of the electronic book having the affinity and the other of the multiple pages at a same size.

13. A computing device as described in claim 12, wherein the instructions when executed by the one or more computer processors further perform an operation comprising determining, based on a history of the electronic book, that the page or the one or more other pages of the electronic book has the affinity or the affinities, respectively.

14. A computing device as described in claim 12, wherein the instructions when executed by the one or more computer processors further perform operations comprising:

pausing the flip through responsive to a second selection, the second selection being a neutral selection; and
presenting a reverse flip through of the multiple pages on the display responsive to a third selection, the third selection being a negative selection.

15. A computing device as described in claim 12, wherein the instructions when executed by the one or more computer processors further perform an operation comprising, responsive to the selection being to open the electronic book, displaying a beginning and ending thickness of the electronic book approximating a location in the electronic book of the page having the affinity.

16. One or more computer-readable storage media having instructions thereon that, when executed by a processor, perform operations comprising:
determining, based on a highlight, a book-mark, or multiple accesses by a user associated with an electronic book of a page of the electronic book, that the page of the electronic book has an affinity;
receiving a selection to flip through multiple pages of the electronic book via a manual selector; and
responsive to the selection, presenting a flip through of the multiple pages of the electronic book in succession and at a rate, the rate slowed, paused, or stopped during presentation of the page of the electronic book having the affinity, the presenting rendering the page of the electronic book having the affinity at full resolution and rendering other of the multiple pages of the electronic book as an approximation, the presenting rendering the page of the electronic book having the affinity and the other of the multiple pages at a same size.

17. One or more computer-readable storage media as described in claim 16, the instructions, when executed by the processor, further perform an operation comprising determining, based on multiple highlights, multiple book-marks, or multiple other accesses of other users of a second page of the electronic book, that the second page of the electronic book has a second affinity, and wherein presenting the flip through of the multiple pages slows, pauses, or stops the presentation at the second page of the electronic book having the second affinity.

18. A computer-implemented method as described in claim 1, wherein rendering the approximation of the other pages show the approximate location of text and whitespace.

19. A computer-implemented method as described in claim 1, wherein rendering the approximation of the other pages renders pages with illustrations and foregoes rendering actual images of pages that do not include illustrations.

20. A computer-implemented method as described in claim 1, wherein rendering the approximation of the other pages shows a previously prepared set of pages, the previously prepared set of pages used at random or by a closest match to an actual page of text.

* * * * *